(12) United States Patent
Takasaki et al.

(10) Patent No.: US 6,479,187 B1
(45) Date of Patent: Nov. 12, 2002

(54) POWER SOURCE

(75) Inventors: Yoshiharu Takasaki, Ibi-gun (JP); Tatsuhito Horiuchi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 112 days.

(21) Appl. No.: 09/583,017

(22) Filed: May 30, 2000

(30) Foreign Application Priority Data

May 31, 1999 (JP) .......................................... 11-150823

(51) Int. Cl.[7] ................................................ H01M 2/06
(52) U.S. Cl. ....................................... 429/157; 429/158
(58) Field of Search ............................ 429/62, 90, 151, 429/157, 159, 163, 177, 158

(56) References Cited

U.S. PATENT DOCUMENTS

| | | | | |
|---|---|---|---|---|
| 3,657,021 A | * | 4/1972 | Mathews | 136/108 |
| 3,956,019 A | * | 5/1976 | Mabuchi et al. | 136/132 |
| 4,205,121 A | * | 5/1980 | Naitoh | 429/99 |
| 5,225,294 A | * | 7/1993 | Schifrim | 429/99 |
| 5,866,276 A | * | 2/1999 | Ogami et al. | 429/120 |
| 5,879,833 A | * | 3/1999 | Yoshii et al. | 429/62 |
| 6,211,646 B1 | * | 4/2001 | Kouzu et al. | 320/107 |
| 6,303,248 B1 | * | 10/2001 | Peterson | 429/177 |
| 6,324,339 B1 | * | 11/2001 | Hudson et al. | 388/937 |

* cited by examiner

Primary Examiner—Patrick Ryan
Assistant Examiner—M. Wills
(74) Attorney, Agent, or Firm—Wenderoth, Lind & Ponack, L.L.P.

(57) ABSTRACT

A power source is provided with a holder-case for retaining a plurality of power modules which are disposed in a parallel fashion and have sensor leads projecting from their end regions, and end-plates provided with pass bars for connecting the power modules in series. The power module sensor leads are mutually connected outside the end-plates. The sensor leads are flexible lead wires and have the length to allow them to be connected outside the end-plates. The end regions of the sensor leads are connected via connecting implements outside the end-plates.

32 Claims, 21 Drawing Sheets

POWER SOURCE

This application is based on application No. 11-150823 filed in Japan on May 31 1999, the content of which is incorporated hereinto by reference.

BACKGROUND OF THE INVENTION

This invention relates to a high power source used primarily to power a drive motor for automobiles such as hybrid and electric automobiles.

A high current power source used to power an automobile drive motor achieves high output voltage by series connection of a multiplicity of battery cells. This is for the purpose of increasing drive motor output. An extremely high current flows in the power source used for this type of application. For example, in a hybrid automobile, an extremely high current flows in a power source when starting and accelerating because the automobile is accelerated by battery output. It is important for the high current power source to be charged discharged depending on battery condition and, in particular, on battery temperature measured by sensors. This is because an abnormal battery temperature rise results in a drastic reduction of battery efficiency.

To measure battery temperature, batteries mutually connected in series are provided on their surfaces with temperature sensors such as PTC devices which change electrical resistance with battery temperature. Ideally, temperature sensors detect the temperature of all batteries. If any battery temperature has not been detected, and the battery temperature has risen abnormally high, battery performance degradation may occur. In a power source used for automobiles, a multiplicity of batteries are connected in series to increase drive motor output. For this reason, if temperature sensor leads provided with all batteries are individually extracted, the number of the sensor leads becomes extremely large and a circuit for managing temperature becomes complex. For example, when a power source in which two hundred rechargeable batteries are connected in series is designed to detect each battery temperature, the power source requires at least two hundred and one leads.

A power source in which temperature sensors provided on all batteries are mutually connected in series can detect that battery temperature has risen abnormally by two leads regardless of the number of series connections of the batteries. For example, when any battery temperature has risen higher than the set temperature of PTC devices used as temperature sensors, electric resistance of the PTC devices connected in series is markedly increased.

To realize this, a power source containing a multiplicity of batteries, as shown in the diagrammatic cross-section view of FIG. 1, has sensor leads 3014 connected to power module 301 temperature sensors 3013, and are mutually connected in series via sensor connecting plates 3025. In the power source shown in this figure, sensor connecting plates 3025 are fixed, in an insulated state, to end regions of a holder-case retaining a plurality of power modules 301, and power module 301 sensor leads 3014 located adjacent to both ends of the sensor connecting plates 3025 are connected to the sensor connecting plates 3025 via setscrews 3035.

As shown in FIG. 2, in the power source having the connecting structure for power modules 301 shown in FIG. 1, plastic end-plates 303 are fixed to ends of the holder-case retaining power modules 301, and metal sensor connecting plates 3025 are fixed to the end plates 303 to allow the sensor connecting plates 3025 to be disposed in an insulated state and in fixed positions. For example, a power source with this structure is cited In Japanese Non-examined Patent Publication HEI. 10-270094 (1998). As shown in the oblique view of FIG. 3, the power source necessitates connection of sensor connecting plates 3025 on the backsides of plastic end-plates 303.

In the power source with the structure described above, power module 301 sensor leads 3014 are connected to both ends of a sensor connecting plate 3025 fixed to an end-plate 303 via setscrews to mutually connect them in series. This type of power source, however, requires connection of sensor leads 3014 disposed on both ends of all power modules 301 to the sensor connecting plates 3025 via setscrews 3035. Accordingly, the power source requires screw-fastening of sensor leads 3014 to sensor connecting plates 3025 in twice as many places as the number of necessary power modules 301. A power source contains a considerably large number of power modules. For example, a power source having the end-plates shown in FIGS. 2 and 3 houses sixteen power modules and requires thirty-two screw-fastenings of sensor leads 3014 to the sensor connecting plates 3025. For this reason, this type of power source has the drawback that assembly work requires much time, and manufacturing cost becomes high. Further, trouble with connecting parts of sensor leads 3014 (such as contact failure) easily occurs, and this makes it difficult for a power source with a large number of connecting parts to improve reliability. If contact failure occurs in sensor leads 3014, the power source can not work normally because of the trouble. In case of a power source used for automobiles, high reliability is necessary. This is because any trouble with a power source results in stopping of the motor.

The present inventor developed the power source shown in FIGS. 4 and 5 to resolve these problems. In that power source, adjacent power module 401 sensor leads 4014 are connected on an end-plate 403. Furthermore, one of the power module 401 sensor leads 4014 is extended to the other sensor lead 4014 to directly connect with it on the end-plate 403. In addition, reference numbers 4013, 4035 and 4025 show a temperature sensor, a setscrew and a sensor connecting plate in these figures.

A power source with this structure can be easily assembled and can drastically reduce manufacturing cost due to reducing the number of sensor lead connecting parts by half. In addition, the power source has the characteristic that contact failure in the sensor lead connecting parts can be reduced to improve reliability.

This type of power source, however, has the drawback that if two connecting parts disposed at the ends of sensor leads slip out of end-plate connecting positions, it requires a remarkably large amount of time to set the sensor lead connecting parts in fixed positions of the end-plate. Unfortunately, it is extremely difficult to process the connecting positions disposed at the ends of sensor leads with high precision since the positions easily slip from the end-plate fixed positions. This is because a plurality of batteries are connected in series, the sensors are fixed on the surfaces of batteries, and sensor leads are connected to the sensors. There is some error in measurement in batteries, and the measurement error in batteries is greater than in plastic and metal manufactured goods. Further, the measurement error in power modules in which a plurality of batteries are connected becomes even greater due to accumulation of the battery measurement error. Still further, it is difficult to accurately fix the sensors in fixed positions disposed on the battery surfaces. These are accumulated and cause slippage of sensor leads from the fixed connecting positions. For this reason, a power source having the structure shown in FIGS. 4 and 5 can realize the characteristic that the number of sensor lead connecting places can be reduced, but makes it difficult to efficiently connect sensor leads in each fixed connecting position. Furthermore, this type of power source has the drawback that connecting work requires much time, and assembly cost becomes high due to a considerably large number of power module series connections and a large number of sensor lead connecting parts.

The present invention was developed to resolve these types of problems with prior art power sources. Thus, it is a primary object of the present invention to provide a power source in which a multiplicity of sensor leads can be assembled simply, easily and efficiently, and in which assembly cost is low even though there is some error in measurement in the sensor leads.

The above and further objects and features of the invention will more fully be apparent from the following detailed description with the accompanying drawings.

SUMMARY OF THE INVENTION

The power source of the present invention includes a plurality of power modules with sensor leads projecting from their end regions. A holder-case for holding the power modules is disposed in a parallel fashion, and end-plates is provided with pass bars for connecting the power modules in series. Sensor leads of adjacent power modules housed within the holder-case are connected outside the end-plates.

Further, in the power source of the present invention, power module sensor leads are flexible lead wires, and the sensor leads of adjacent power modules housed in the holder-case are extended to the length allowing them to be connected outside the end-plates. The end parts of the extended sensor leads are directly connected via connecting implements outside the end-plates.

The power source with this structure has the characteristic that a multiplicity of sensor leads can be assembled easily and efficiently, and assembly cost is low. Further, the sensor leads can be connected easily and efficiently even if the connecting parts cannot accurately meet due to the sensor lead measurement error.

DETAILED DESCRIPTION OF THE INVENTION

Figure 1:
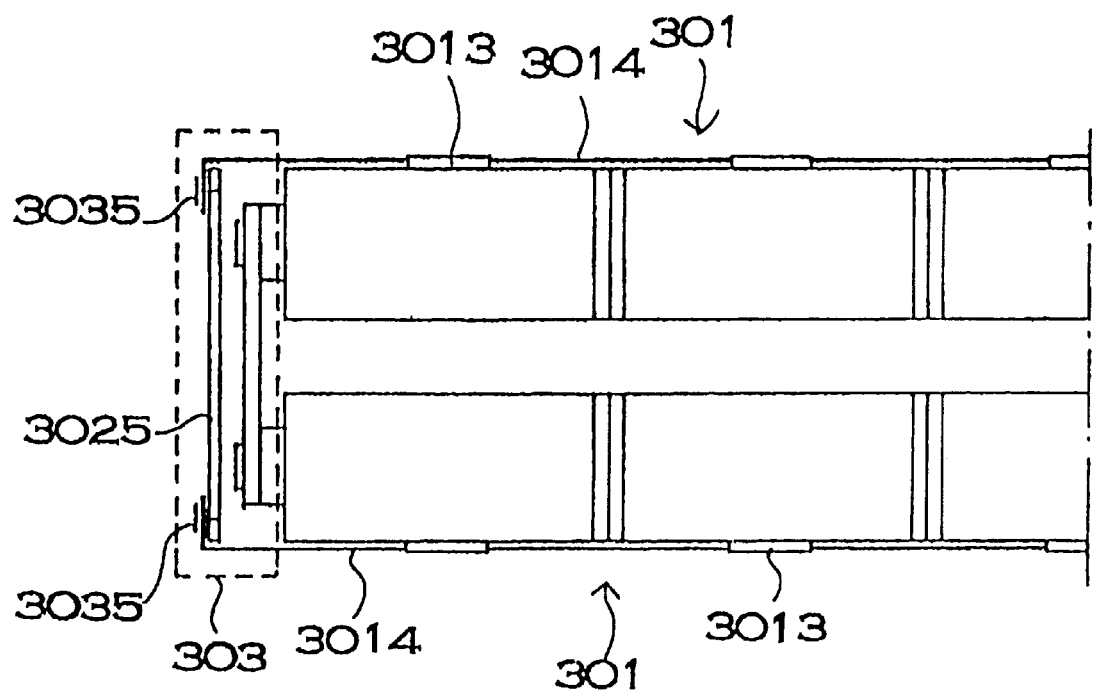
FIG. 1 is a diagrammatic cross-section view showing a prior art power source.
Figure 2:
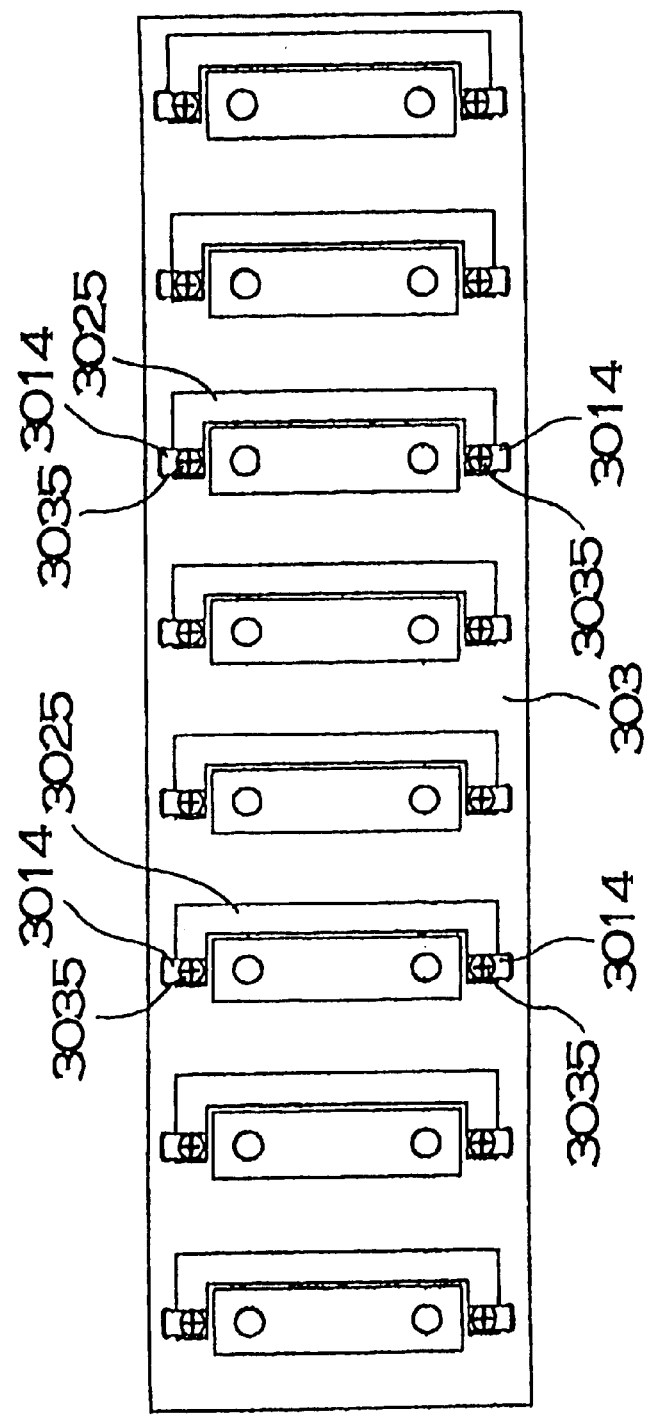
FIG. 2 is a backside view showing the sensor lead connecting structure of the power source shown in FIG. 1.
Figure 3:
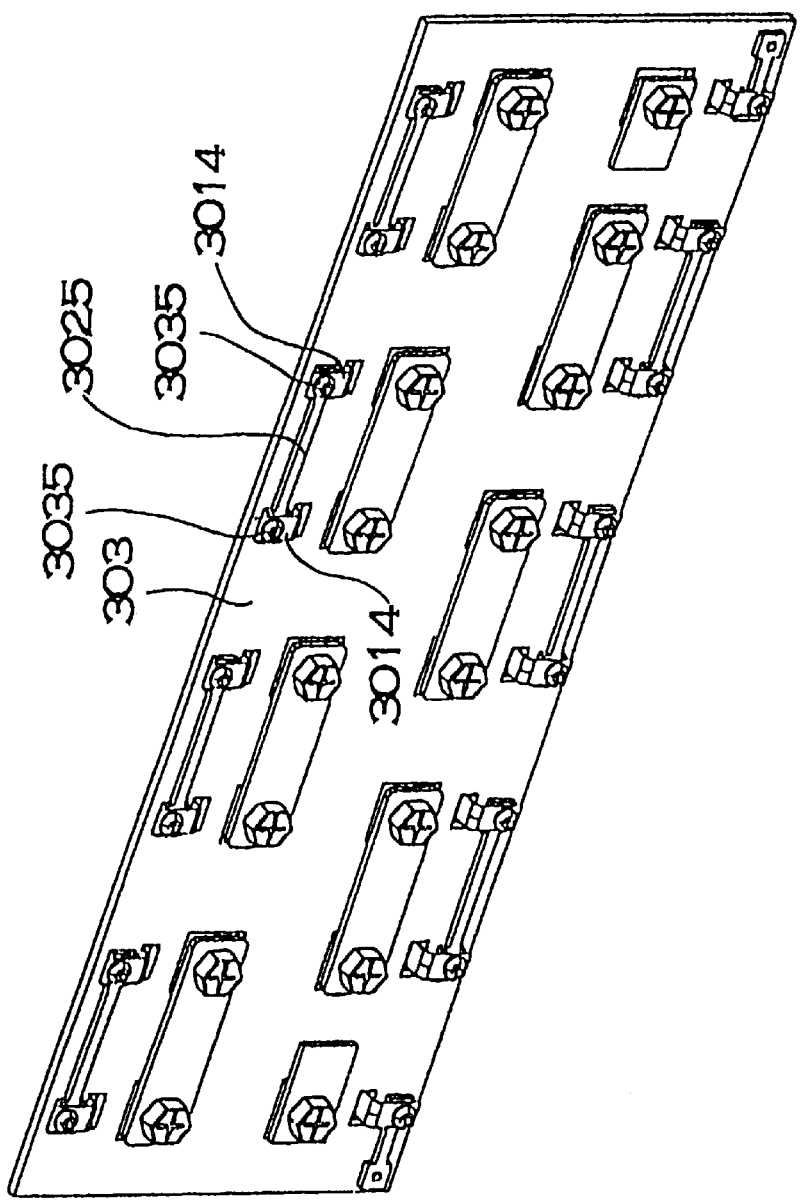
FIG. 3 is an oblique view showing end-plates of a prior art power source.
Figure 4:
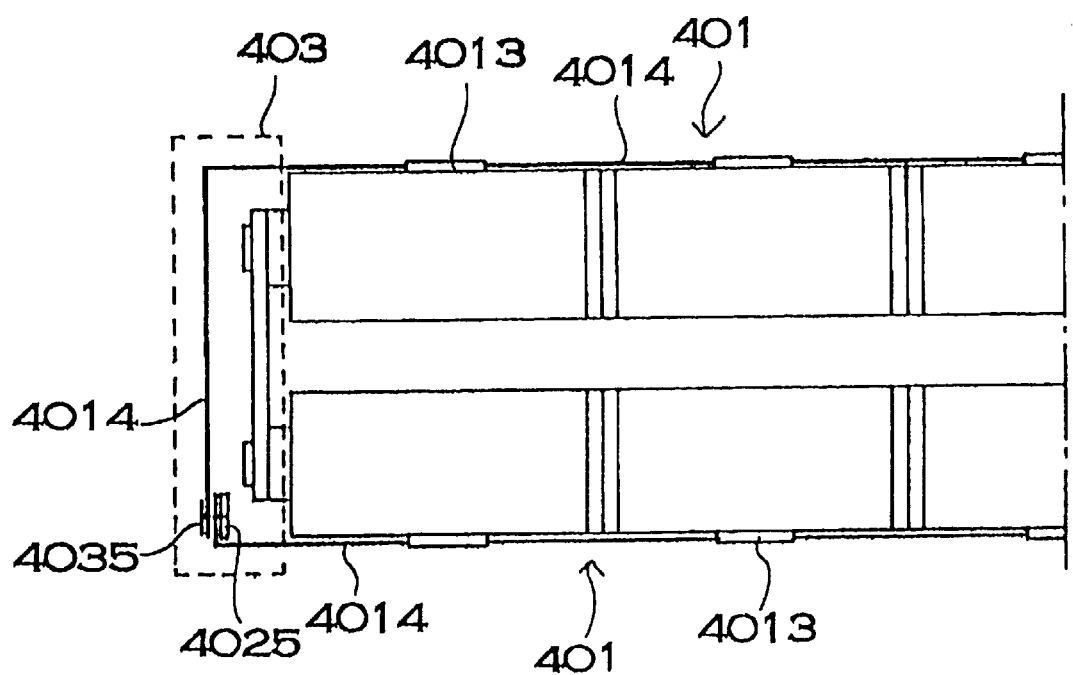
FIG. 4 is a diagrammatic cross-section view showing a power source developed previously by the present inventor.
Figure 5:
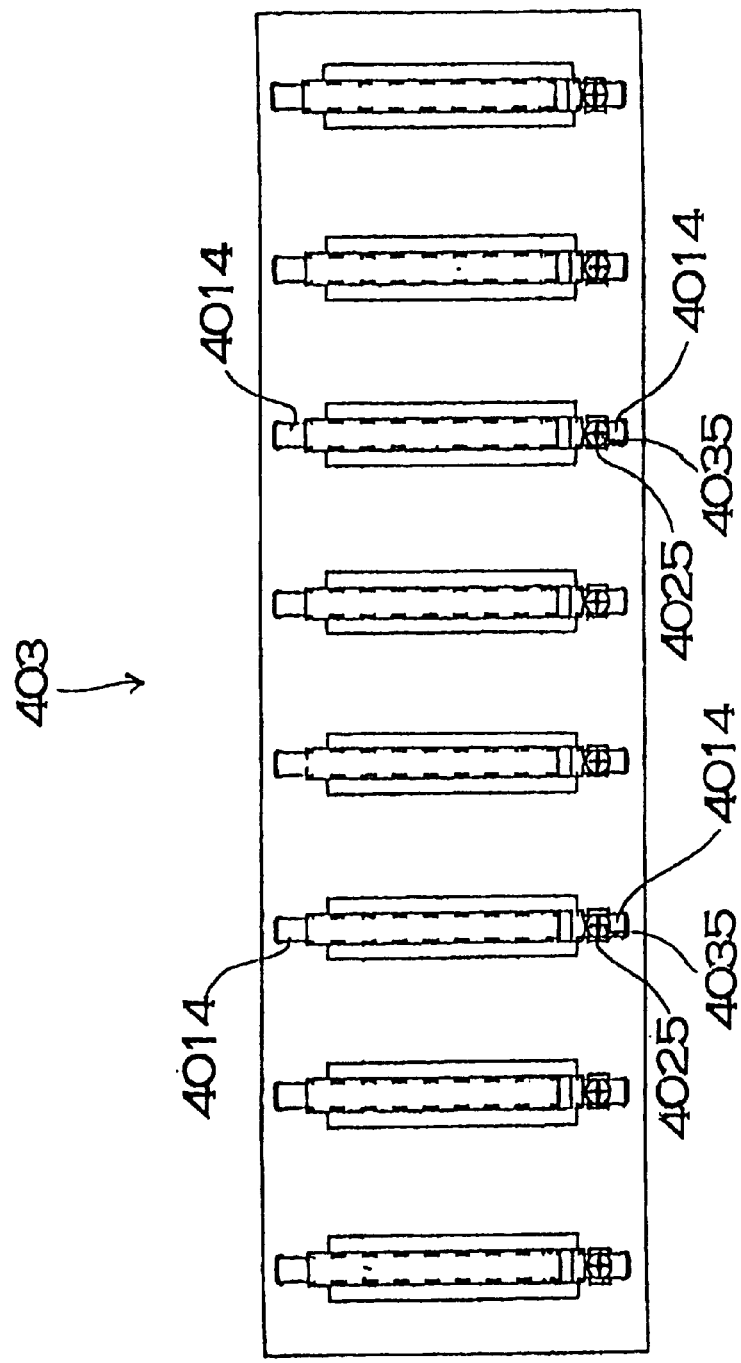
FIG. 5 is a backside view showing the sensor lead connecting structure of the power source shown in FIG. 4.
Figure 6:
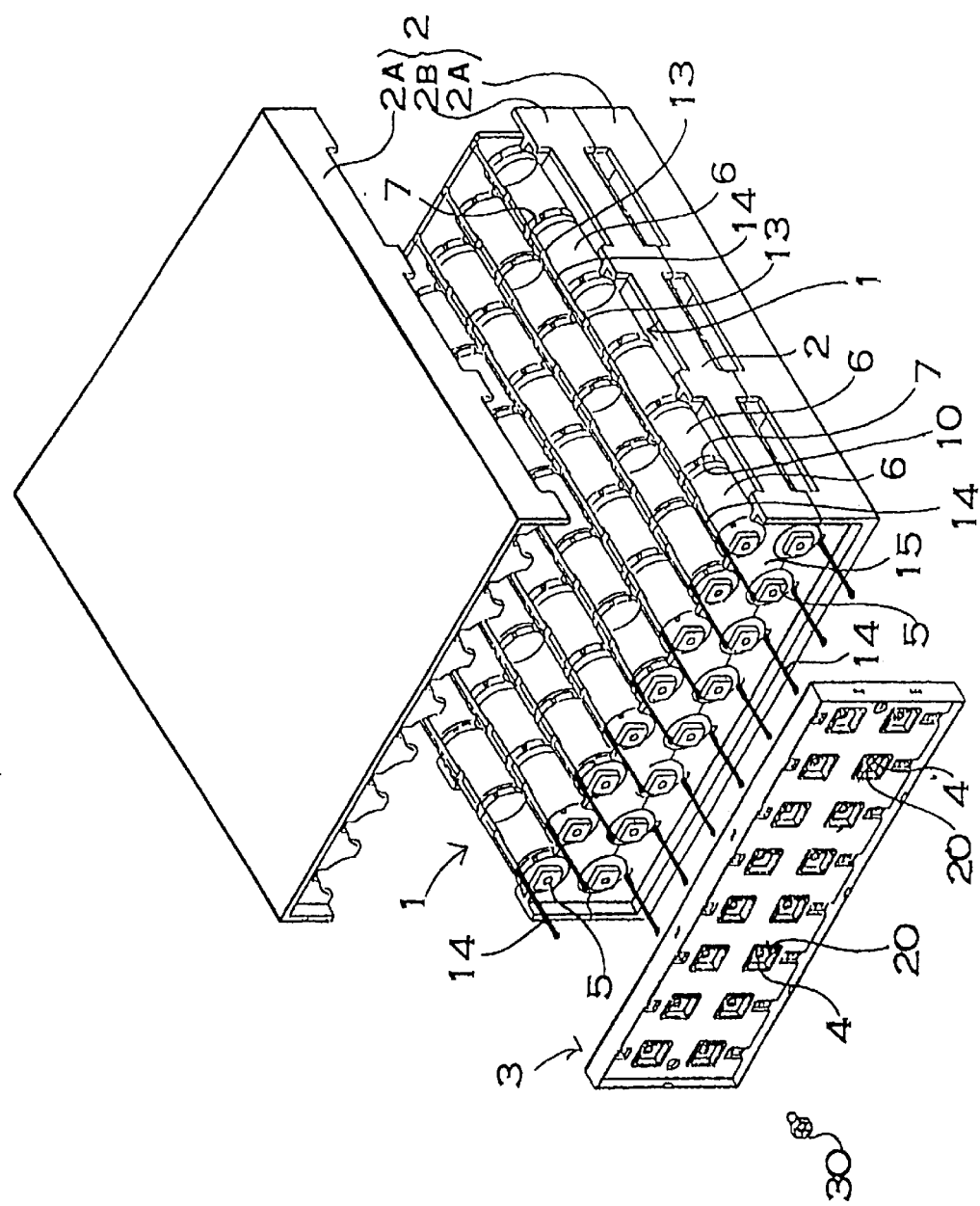
FIG. 6 is an exploded oblique view showing an embodiment of the power source of the present invention.

As shown in FIG. 6, a power source is provided with a holder-case 2 for holding a plurality of power modules 1 in a parallel fashion. A power module 1 has a plurality of rechargeable batteries or large capacitance super-capacitors joined in a linear fashion. The power module 1 in FIG. 6 has six series connected rechargeable batteries 6 joined in a straight line. The rechargeable batteries 6 of the power modules 1 are nickel-hydrogen batteries. However, nickel-cadmium batteries or lithium-ion batteries may also be used as the rechargeable batteries 6 of the power modules 1. A power module 1 using super-capacitors has a plurality of super-capacitors electrically connected in parallel. However, a power module may also be made up of a single rechargeable battery or super-capacitor. The power modules shown in FIG. 6 have circular cylindrical rechargeable batteries 6 joined in a straight line by dish-shaped connectors 7. Positive and negative electrode terminals 5 are connected at the ends of a power module 1.

Figure 7:
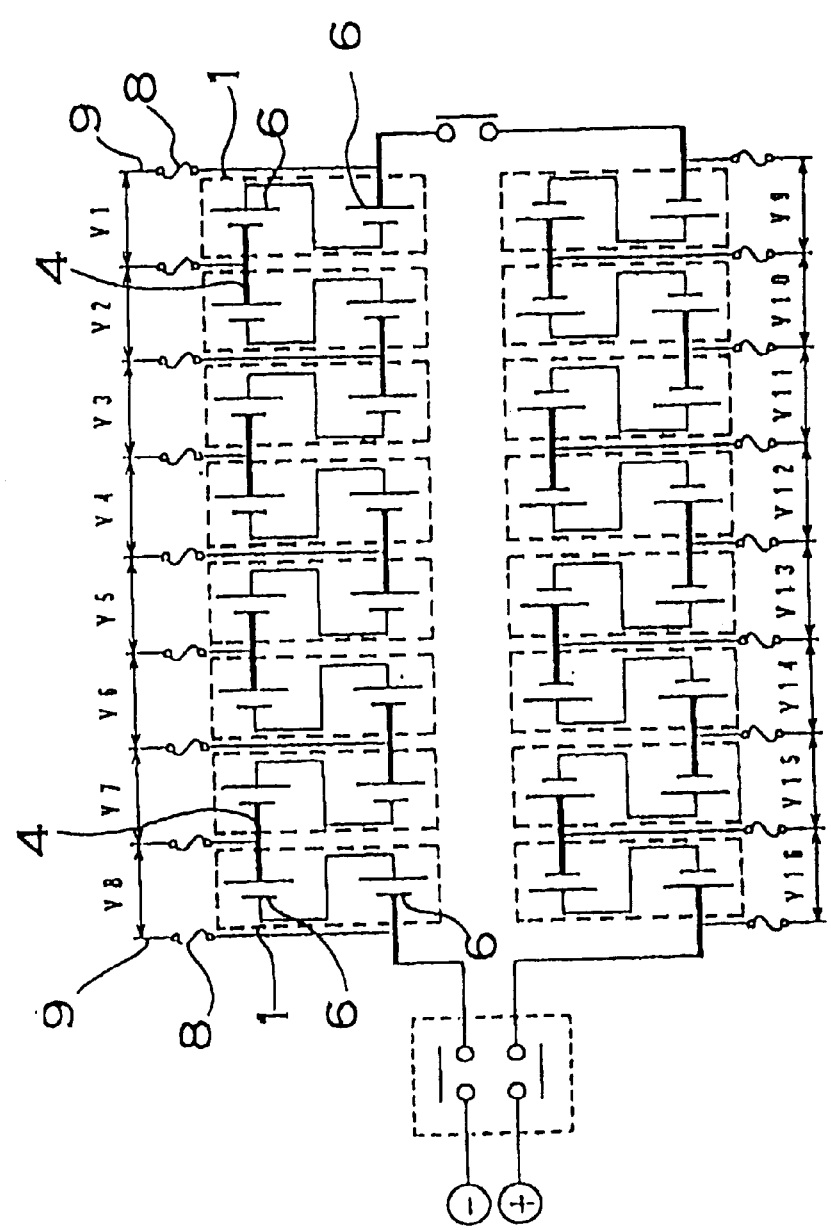
FIG. 7 is a circuit diagram of an embodiment of the power source of the present invention.

Turning to FIG. 7, a circuit diagram of the power source shown in FIG. 6 is shown. The power source shown in this figure houses 2 levels of 8 rows of power modules 1, and the power modules 1 are electrically connected in series. In the power source shown in this figure, leads 9 are connected via fuses 8 to each power module 1 for independently measuring the voltage of each power module 1.

Figure 8:
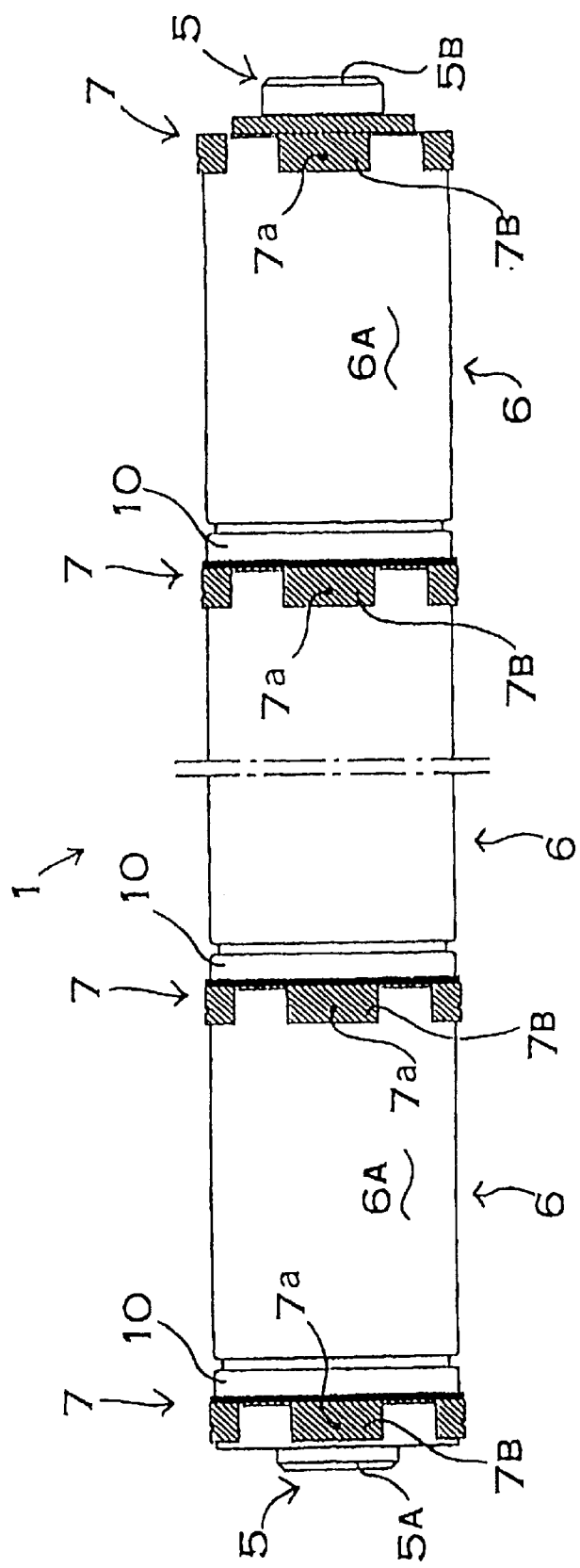
FIG. 8 is a side view of the power modules housed in the power source shown in FIG. 6.
Figure 9:
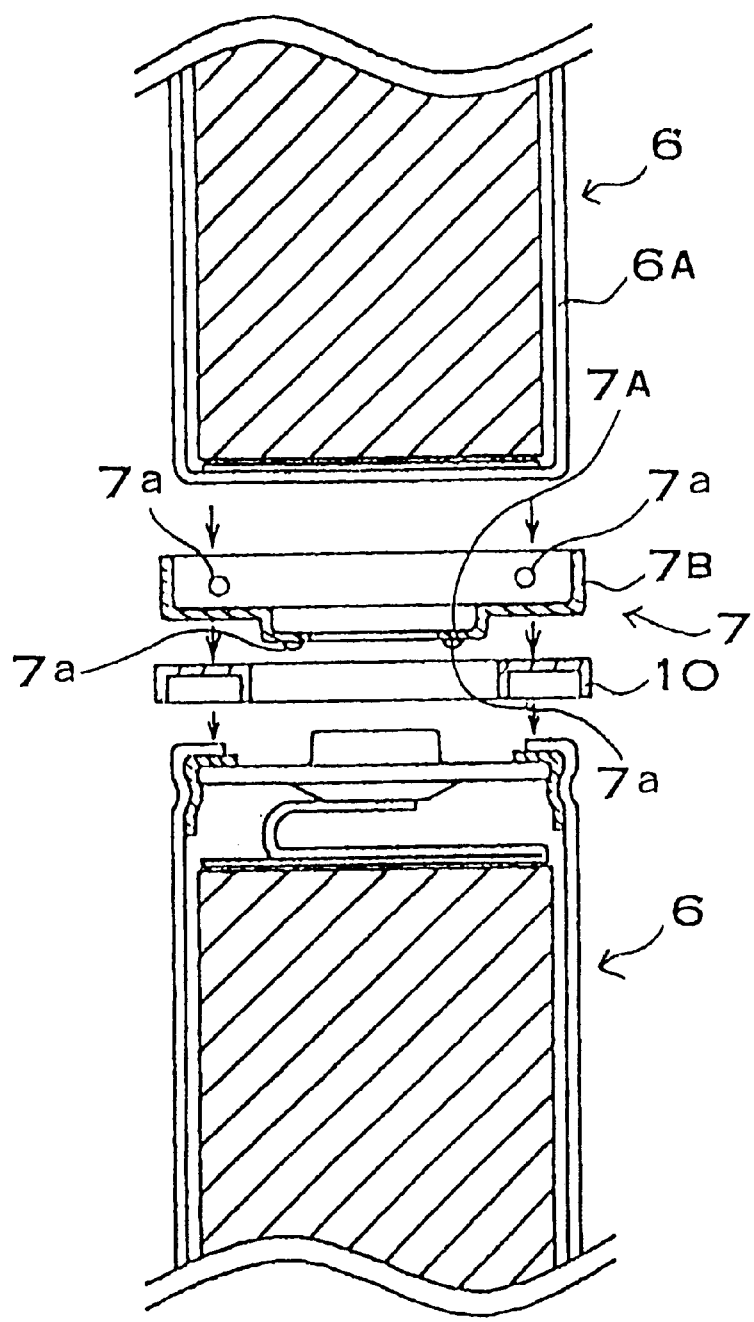
FIG. 9 is an exploded cross-section view showing the connecting structure for batteries of power module shown in FIG. 8.

Turning to FIGS. 8 and 9, a power module 1 in which a plurality of rechargeable batteries are connected in series is shown. In a power module 1 with this structure, a disk region 7A of a dish-shaped connector 7 is weld-connected to the positive terminal of a circular cylindrical battery 6. The disk region 7A of the dish-shaped connector 7 is provided with projections 7a to be welded to the positive terminal of the circular cylindrical battery 6. When the projections 7a of this dish-shaped connector 7 are welded to the positive terminal, welding electrode rods push on the top surfaces of the projections 7a. To prevent short circuits between the dish-shaped connector 7 and the circular cylindrical battery 6, a ring-shaped insulator 10 is sandwiched between the dish-shaped connector 7 and the circular cylindrical battery 6.

In addition, a circular cylindrical battery 6 is inserted into the dish-shaped connector flange region 7B to connect the negative terminal of the circular cylindrical battery 6, which is its outer case 6A, with the flange region 7B. Similar to the disk region 7A, the flange region 7B also has projections 7a provided on its inner surface to be welded to the battery outer case 6A. During welding, welding electrode rods push on the outside of the flange region 7B projections 7a.

Figure 10:
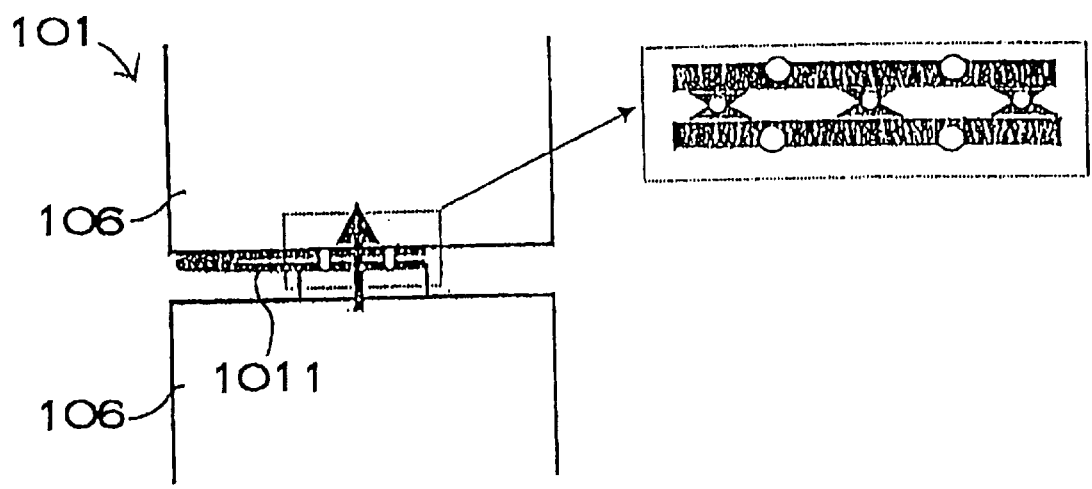
FIG. 10 is a cross-section view showing an example of another power module battery connecting structure.

As shown in the cross-section view of FIG. 10, series connected batteries can be joined without using dish-shaped connectors by welding the batteries to opposing sides of lead-plates 1011 bent in a U-shape. In the power module 101 in this figure, opposing sides of U-shaped lead-plates 1011 are welded by passing a high current pulse through batteries 106 in the direction of battery discharge. For example, lead-plates 1011 can be welded by passing a high current pulse of 1 KA for approximately 15 msec.

Figure 11:
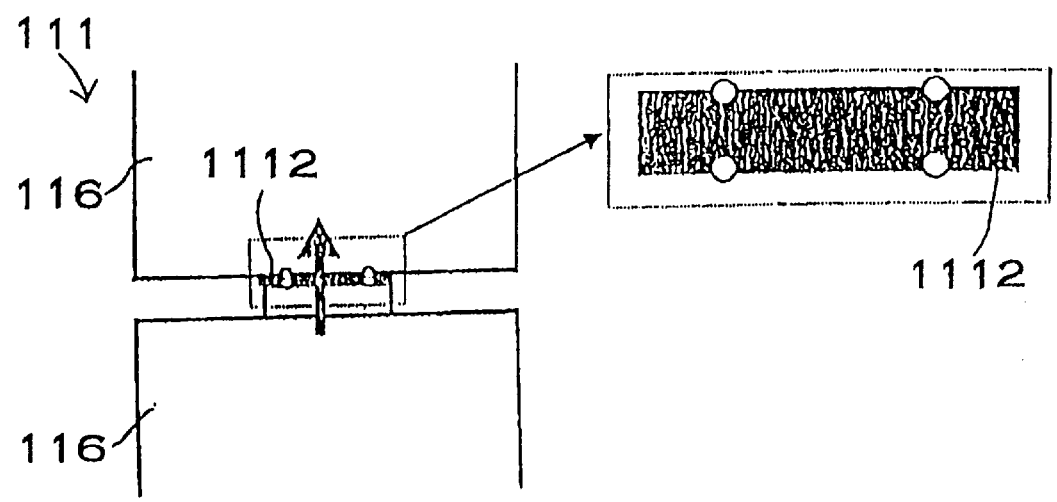
FIG. 11 is a cross-section view showing an example of another power module battery connecting structure.

Further, as shown in the cross-section view of FIG. 11, metal plates 1112 can be sandwiched between positive and negative battery 116 terminals. A high current pulse can be passed through the batteries 116 in their direction of discharge to weld the metal plates 1112 to the battery 116 terminals.

Figure 12:
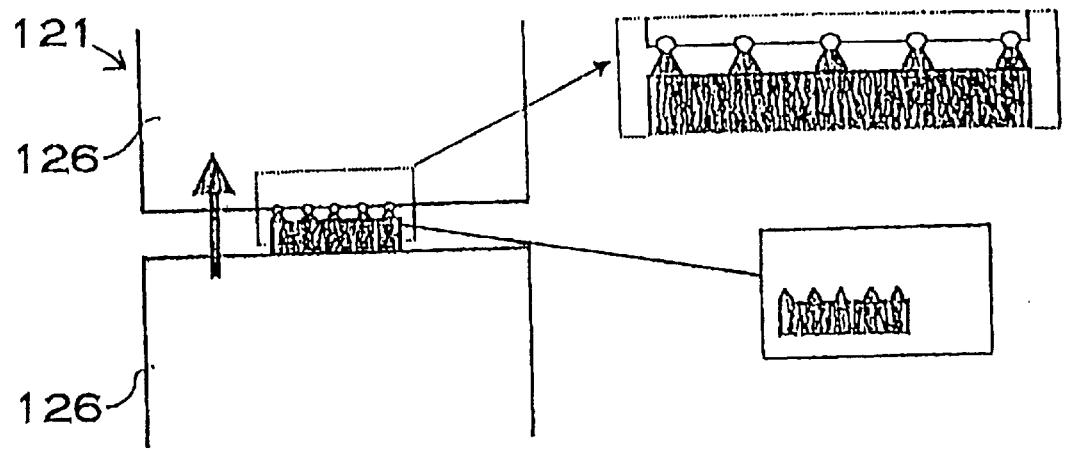
FIG. 12 is a cross-section view showing an example of another power module battery connecting structure.

Still further, as shown In FIG. 12, battery 126 positive and negative terminals can also be directly welded together with no intervening metal plate between batteries 126. Here, conical projections are provided on the upper surface of a battery sealing plate, which is the positive electrode terminal, and these projections are welded to the negative electrode terminal of an adjacent battery 126 by passage of a high current pulse.

Power modules, as shown in FIGS. 10 through 12, with positive and negative battery terminals directly weld-connected without using dish-shaped connectors, or with positive and negative battery terminals directly weld-connected on both sides of a metal plate, can drastically reduce electrical resistance between the batteries. These power modules also have the characteristic that the connected strength of the batteries can be made robust.

Figure 13:
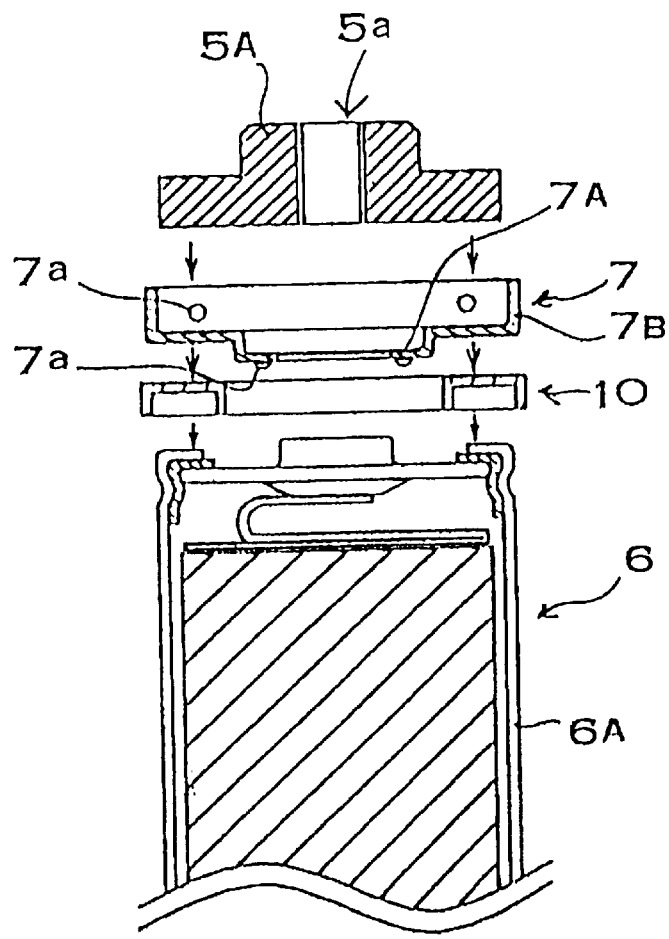
FIG. 13 is an exploded cross-section view showing the positive-side electrode terminal connecting structure for the power module shown in FIG. 8.
Figure 14:
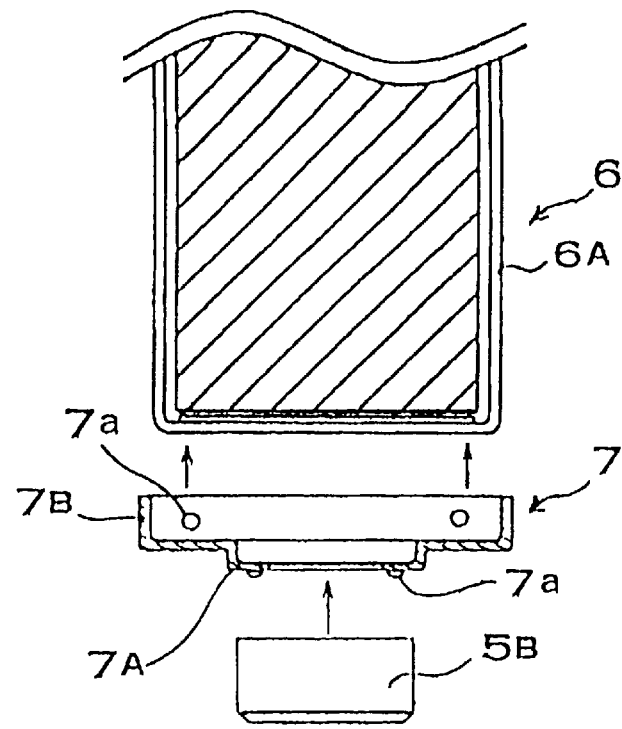
FIG. 14 is an exploded cross-section view showing the negative-side electrode terminal connecting structure for the power module shown in FIG. 8.
Figure 15:
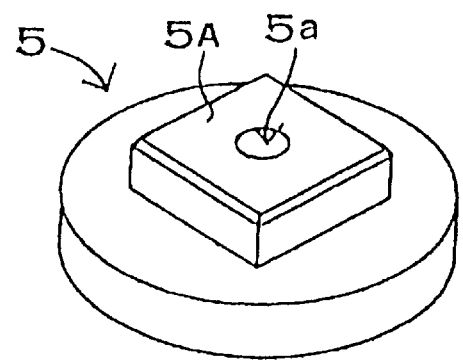
FIG. 15 is an enlarged oblique view of the positive electrode terminal shown in FIG. 13.
Figure 16:
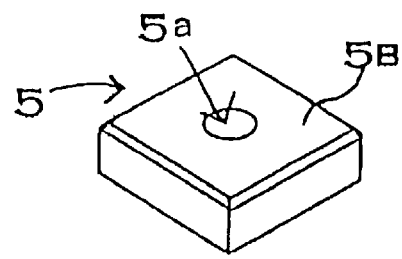
FIG. 16 is an enlarged oblique view of the negative electrode terminal shown in FIG. 14.

As shown in FIGS. 13 and 14, power modules, which are connected in series, have the positive side of the batteries 6 connected to a positive terminal 5A and the negative side connected to a negative terminal 5B. As shown in the oblique views of FIGS. 15 and 16, the central projection of the positive terminal 5A and the negative terminal 5B are formed in the shape of a square pillar. The purpose of the square pillar shape of the central projection of the positive terminal 5A and the negative terminal 5B is for alignment and connection of a plurality of power modules 1 into windows 20 opened in the end-plate 3. Threaded screw holes 5a for connecting pass-bars 4 are provided at the center of electrode terminals 5, namely the positive terminal 5A and the negative terminal 5B.

Figure 17:
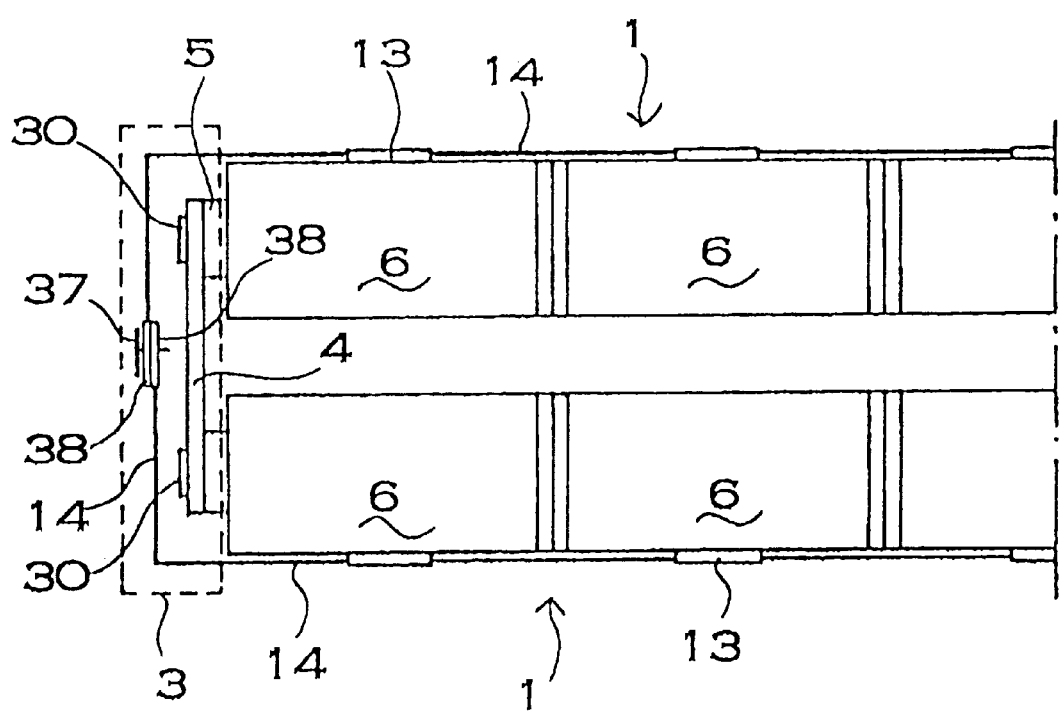
FIG. 17 is a diagrammatic cross-section view showing the sensor lead connecting structure for an embodiment of the power source of the present invention.

As shown in FIGS. 6 and 17, temperature sensors 13 are fixed on the surface of each battery 6 of a power module 1. The temperature sensors 13 are devices which can measure battery temperature. Preferably, PTC devices which change electrical resistance with battery temperature are used as temperature sensors 13. The temperature sensors 13 fixed on the surface of each battery are connected linearly and in series via sensor leads 14, which extend along, and are fixed lengthwise to the power module 1 surfaces. Temperature sensors 13 are fixed on battery 6 surfaces by material such as heat-shrink tubing covering power module surfaces. Sensor leads 14 connected to the temperature sensors 13 project from both ends of the power module 1.

In the power source, all temperature sensors are connected in series via sensor leads 14. This type of power source can control power module 1 temperature with a simple circuit and cool the power modules 1 by current cut-off or compulsory passage of wind when any power module temperature has risen higher than the set temperature. However, in the power source of the present invention, it is not always necessary to connect all temperature sensors in series. Power modules housed in a holder-case may be divided into a plurality of blocks and the temperature of each block may also be controlled.

Figure 18:
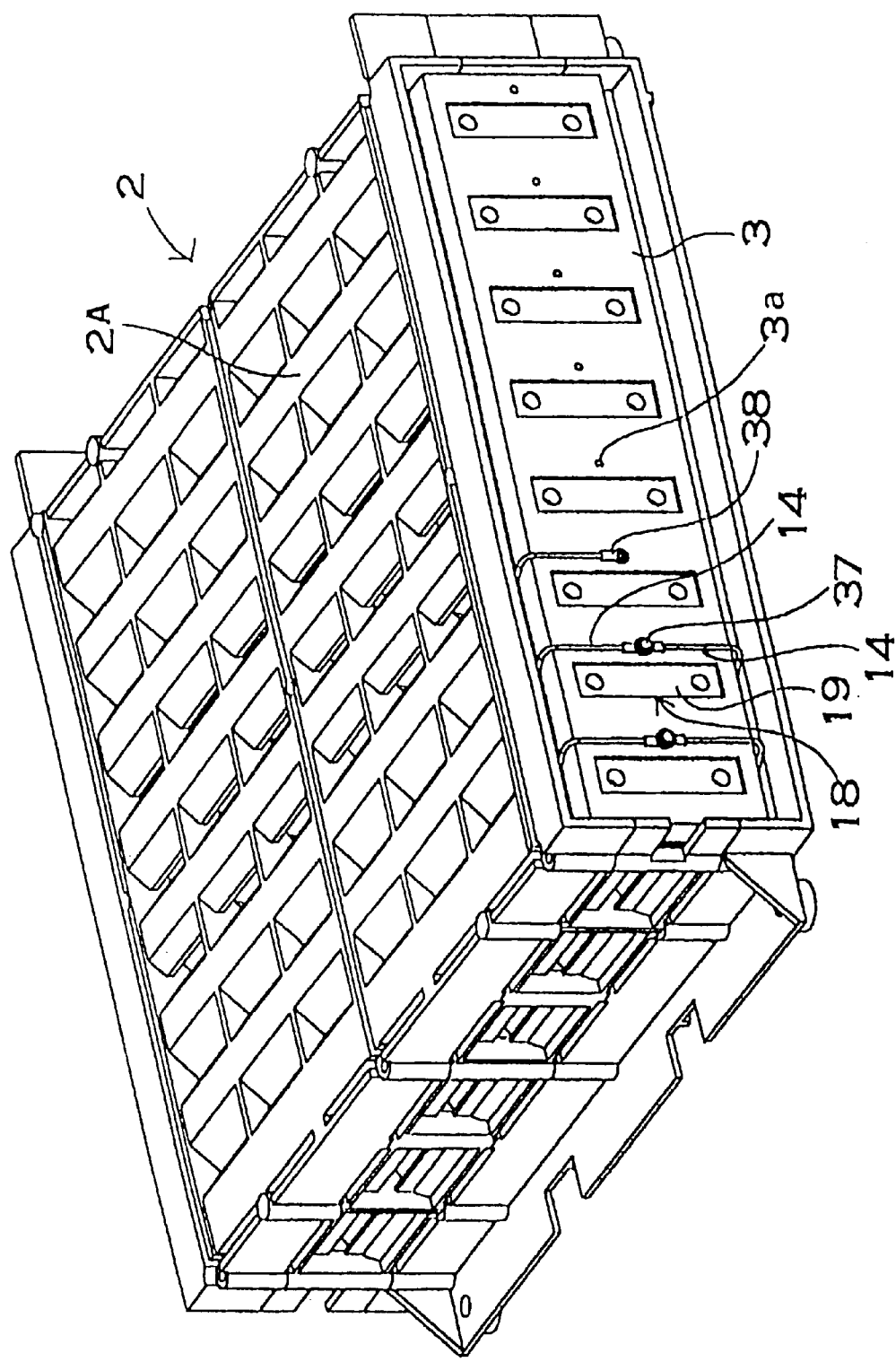
FIG. 18 is an oblique view of an embodiment of the power source of the present invention.

As shown in FIGS. 17 and 18, sensor leads 14 projecting from both ends of power module 1 are connected outside an end-plate 3. The purpose of connecting outside the end-plate 3 is to mutually connect adjacent power module 1 temperature sensors 13 in series. The sensor leads 14 are flexible lead wires capable of being freely deformed by hands, and project from the power module 1 surfaces to the length allowing them to be connected outside the end-plate 3. The end regions of the sensor leads 14 are connected via a connecting implement 37.

Figure 19:
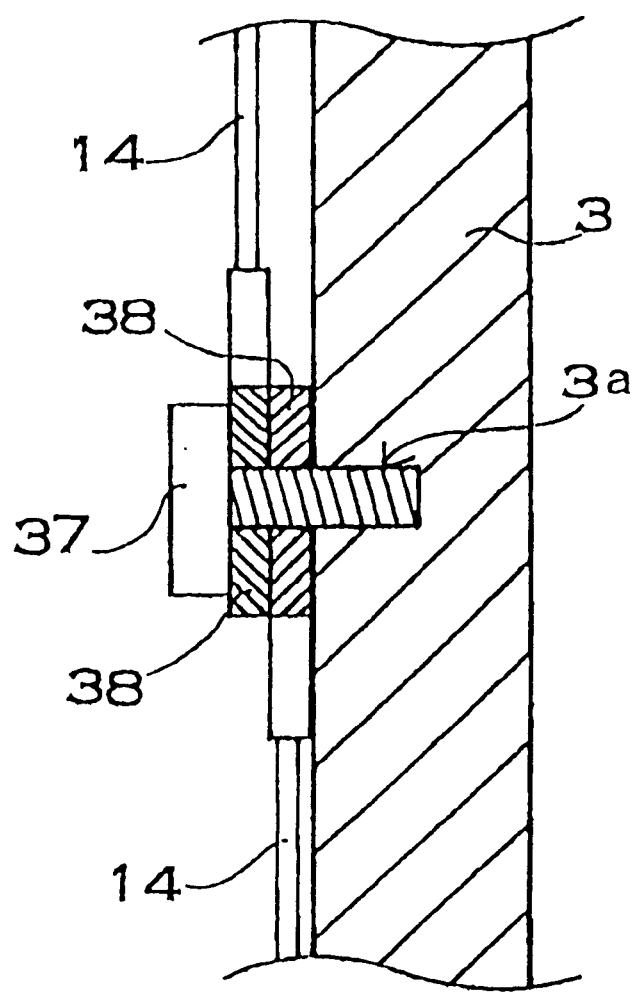
FIG. 19 is an enlarged cross-section view showing the sensor leads connected via connecting implement.

Sensor leads 14 are covered with insulating material, and are provided with metal rings 38 at their ends. The metal ring 38 is a terminal to be attached with pressure or a metal terminal to be connected by soldering. The insulating material of lead wires is removed to electrically connect the metal rings 38 to the sensor leads 14. Sensor leads having this structure, as shown in the crosssection view of FIG. 19, are connected by passing a setscrew used as a connecting implement 37 through metal rings 38. The setscrew in FIG. 19 is screwed into an end-plate 3 through adjacent power module 1 sensor leads 14, namely through the metal rings 38 disposed at the ends of two sensor leads 14. Threaded screw holes to allow passage of setscrews 3a are arranged in each of the end-plates 3, or nuts are fixed in the end-plates 3. Connecting implements 37 with this structure can surely connect sensor leads 14 by screwing setscrews into the end-plates 3, and can fix the connecting parts of sensor leads 14 to the end-plates 3.

In the power modules 1 shown in FIG. 17, power module 1 sensor leads 14, which are provided vertically, are extended to be approximately the same in length and are connected approximately at the center of the end-plate 3, However, in the power source of the present invention, it is not always necessary that adjacent power module sensor leads are the same in length. One sensor lead can be made to be longer than the other sensor lead so as to be connected outside the end-plate.

Figure 20:
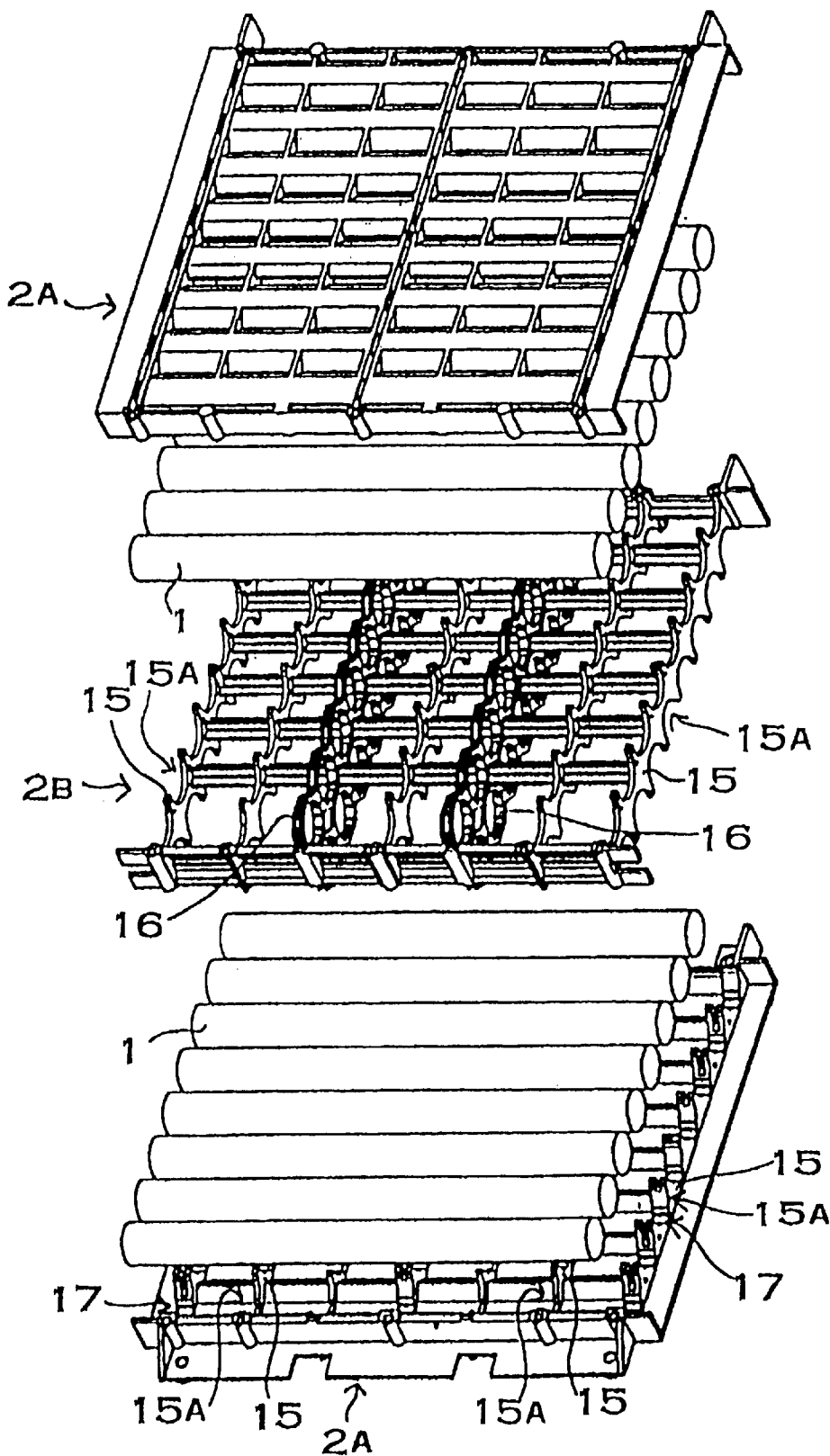
FIG. 20 is an exploded oblique view of the holder-case of the power source shown in FIG. 6.
Figure 21:
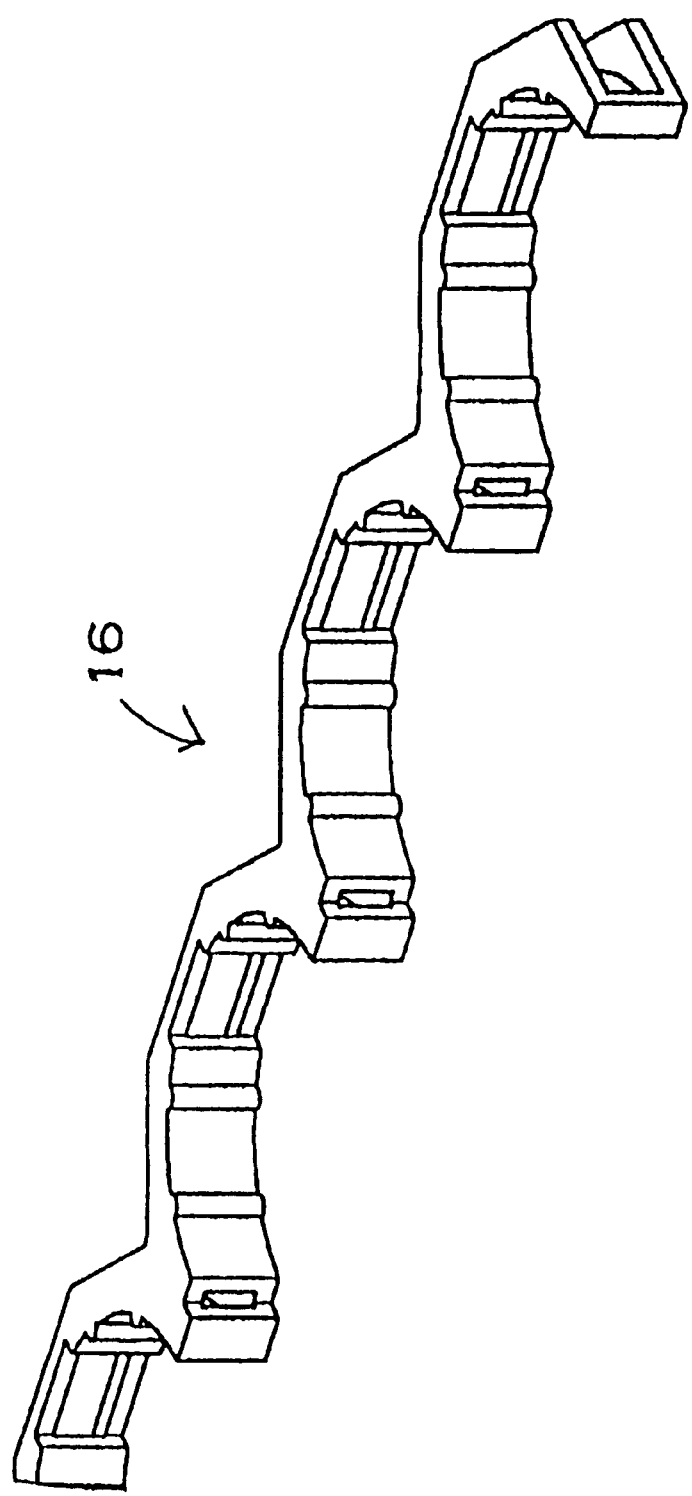
FIG. 21 is an enlarged oblique view of the shock-absorbing gaskets connected to the holder-rib of the holder-case shown in FIG. 20.

Turning to the exploded oblique view of FIG. 20, a holder-case 2 is provided with cover-casings 2A shown on the top and bottom and an intermediate-casing 2B disposed between the top and bottom cover-casings 2A. The cover-casings 2A and the intermediate-casing 2B are formed entirely of plastic. Holder ribs 15 are formed as a single piece with the cover-casings 2A and the intermediate casing 2B for the purpose of sandwiching and retaining power modules 1 in fixed positions. The cover-casings 2A and the intermediate-casing 2B shown in FIG. 20 are provided with a plurality of parallel rows of holder ribs 15 at both ends and at intermediate positions. Holder ribs 15 are provided on the inside of cover-casings 2A and on each of the sides of intermediate-casing 2B. Holder ribs 15 are provided with retaining cavities 15A curved in half-circular shapes which follow power module 1 outlines to retain the circular cylindrical power modules in fixed positions. The circular cylindrical power modules 1 are sandwiched between the retaining cavities 15A and held in fixed positions. Battery 6 shock-resistance can be improved by flexible rubber shock-absorbing gaskets 16 attached along retaining cavities 15A. The holder-case 2 in FIG. 20 has shock-absorbing gaskets 16 attached to 2 rows of holder ribs 15. As shown in FIG. 21, the shock-absorbing gaskets 16 are formed in shapes that conform to the holder ribs 15. A holder-case 2 in which shock-absorbing gaskets 16 are connected to holder ribs 15 can prevent batteries 6 from vibration by the shock-absorbing gaskets 16.

Holder ribs 15 are provided with guiding grooves 17 at the bottom of the retaining cavities 15A for guiding temperature sensors 13 and sensor leads 14, which project from the surface of the power modules 1. The temperature sensors 13 and sensor leads 14 are inserted into the guiding grooves 17, and power modules 1 are sandwiched in fixed positions via the holder ribs 15 retaining cavities 15A.

A holder-case 2 with the above structure is assembled as follows to retain power modules 1 in a parallel relationship.

(1) The bottom cover-casing 2A is set horizontally and power modules 1 are lined up in a parallel fashion by insertion into holder ribs 15 retaining cavities 15A. In the cover-casing 2A of the figures, 8 rows of power modules 1 are arranged in the holder ribs 15. Power modules 1 are lined up so that both ends are arranged in single planes. At this point, temperature sensors 13 and sensor leads 14 projecting from power module 1 surfaces are guided into holder rib 15 guiding grooves 17.

(2) The intermediate casing 2B is placed on the bottom cover-casing 2A. The power modules 1 insert into the retaining cavities 15A of holder ribs 15 projecting from the bottom surface of the intermediate casing 2B to align the layer.

(3) Power modules 1 are lined up in a parallel fashion by insertion into retaining cavities 15A in the holder ribs 15 projecting from the upper surface of the intermediate-casing 2B. Again, power modules 1 are lined up so that both ends are arranged in single planes.

(4) The top cover-casing 2A is placed over the power modules 1 aligning the top layer cover-casing 2A. In this configuration, power modules 1 are guided into the retaining cavities 15A of holder ribs 15 projecting from the bottom side of the cover-casing 2A.

(5) The top and bottom cover-casings 2A are joined with connecting screws (not illustrated) to connect and hold the top and bottom cover-casings 2A and the intermediate casing 2B together. Connecting screws pass through the top and bottom cover-casings 2A and the intermediate-casing 2B to join them. Connecting screws join the top and bottom cover-casings 2A at the four corner regions and at intermediate locations.

Figure 22:
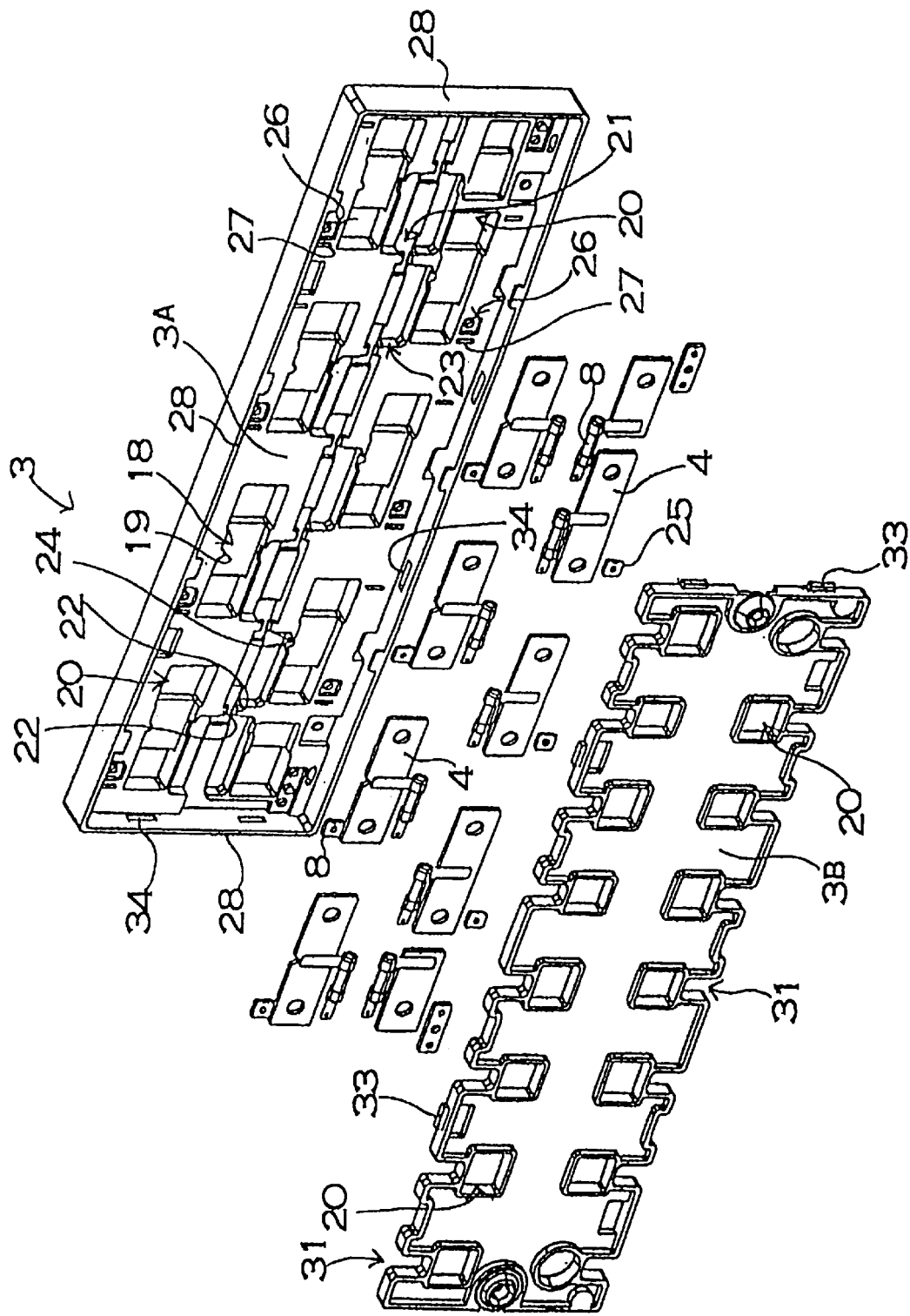
FIG. 22 is an exploded oblique view of the end-plate of the power source shown in FIG. 6.
Figure 23:
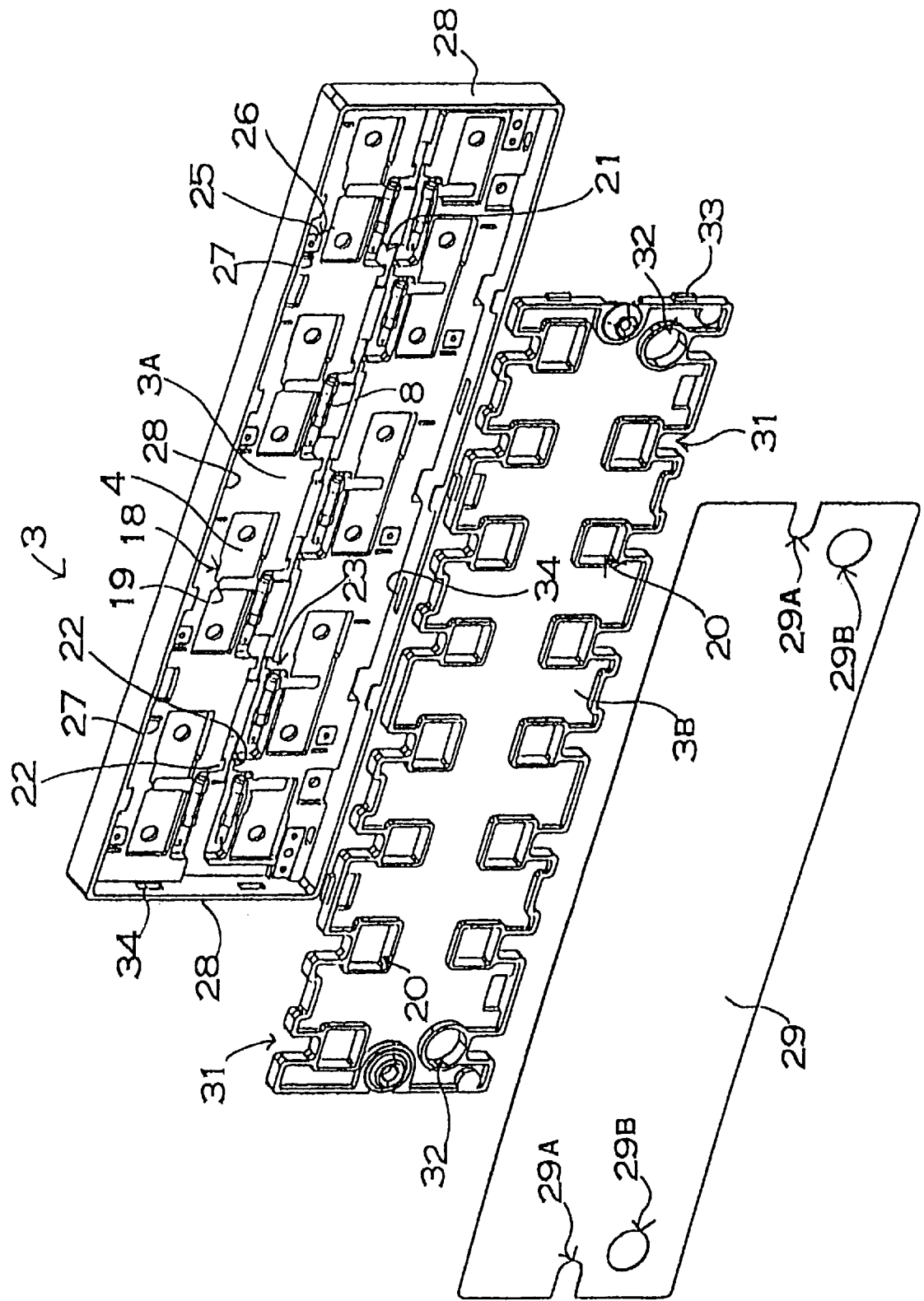
FIG. 23 is an exploded oblique view showing an assembly of the end-plate shown in FIG. 22.

End-plates 3 are fixed to the holder-case 2 retaining power modules 1 in fixed positions in the configuration described above. The end-plates 3 house pass bars 4 for connecting the power modules 1 of the holder-case 2 in series. An end-plate 3 holds pass bars 4 in fixed positions, and, as shown in the exploded oblique views of FIGS. 22 and 23, is provided with a frame section 3A and a cover section 38 which layer together for connection. The frame section 3A and the cover section 3B are formed separately, both of single-piece plastic construction. The frame section 3A is disposed on the side facing the power modules 1, and the cover section 3B is disposed on the backside of the frame section 3A.

The frame section 3A has pass bars 4 disposed on its backside, which connect the power modules 1 in series. Pass bars 4 disposed here are sandwiched between the frame section 3A and a cover section 3B for retention in fixed positions on an end-plate 3.

Figure 24:
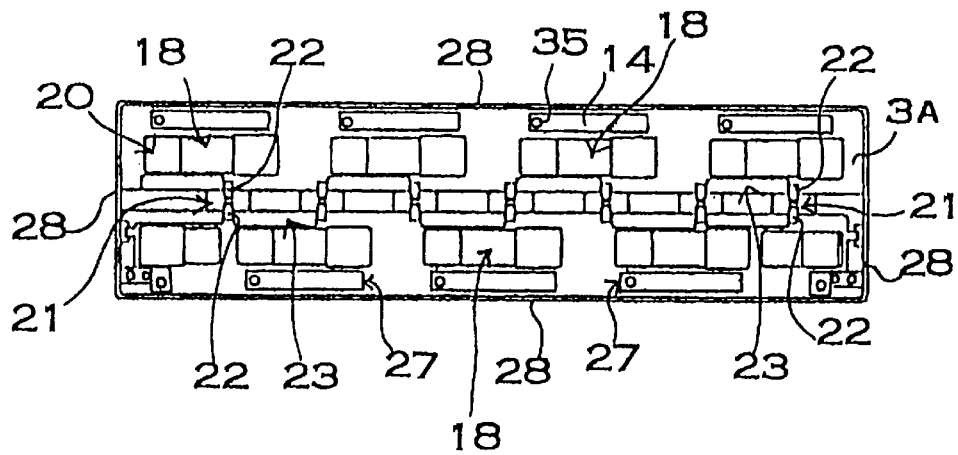
FIG. 24 is a plan view showing the sensor lead connecting structure for the end-plate shown in FIG. 22.
Figure 25:
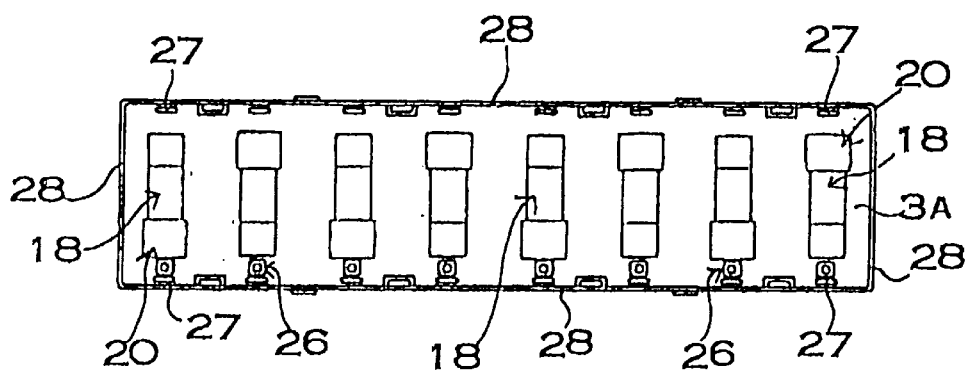
FIG. 25 is a plan view showing the frame section of the end-plate shown in FIG. 18.
Figure 26:
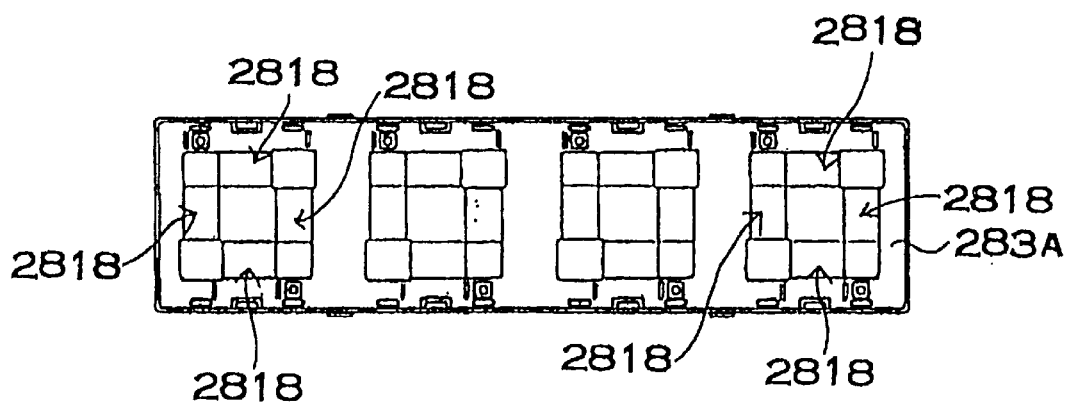
FIG. 26 is a plan view showing an example of another frame section of the end-plate.

The frame section 3A shown in the figures has pass bar insertion cavities 18 formed on its backside to hold bass bars 4 in fixed positions. A pass bar insertion cavity 18 is approximately the same size as a rectangular pass bar 4 outline to allow insertion of a metal plate pass bar 4, but more precisely, the insertion cavity 18 is a slightly larger rectangle. The frame section 3A shown in FIGS. 22 through 24 is provided with pass bar insertion cavities 18 which extend in the lateral direction. In this patent application, pass bar 4 lateral direction is taken to be the lengthwise direction of the pass bar 4, and the direction perpendicular to the lateral direction is taken to be the vertical direction. The frame section 3A shown in FIGS. 18 and 25 is provided with pass bar insertion cavities 18 which extend in the vertical direction. Further, the frame section 283A shown in FIG. 26 is provided with pass bar insertion cavities 2818 in both lateral and vertical directions. Pass bars are inserted into the pass bar insertion cavities 2818 to connect power modules in series.

Stopper clasps 19 are provided at pass bar insertion cavity 18 openings to prevent pass bars 4 from falling out of the cavities, and are formed of a single-piece construction with a frame section 3A. Stopper clasps 19 project from the inside surface of pass bar insertion cavity 18 openings. Stopper clasps 19 shown in the figures project from the inside surface, approximately at the middle of the long side of the pass bar insertion cavity 18 openings. If the stopper clasp 19 projection height is too tall, it will be difficult for the pass bars 4 to fall out of the pass bar insertion cavities 18, but pass bar 4 insertion into the pass bar insertion cavities 18 also becomes difficult. Conversely, if the stopper clasps 19 are short, the pass bars 4 are easy to insert into the pass bar insertion cavities 18, but the pass bars 4 also easily fall out of the pass bar insertion cavities 18. Thus, the stopper clasps 19 are provided at a projection height from the pass bar insertion cavity 18 openings that allows smooth pass bar 4 insertion into the pass bar insertion cavities 18 and effectively prevents the pass bars 4 from failing out of the pass bar insertion cavities 18.

Figure 27:
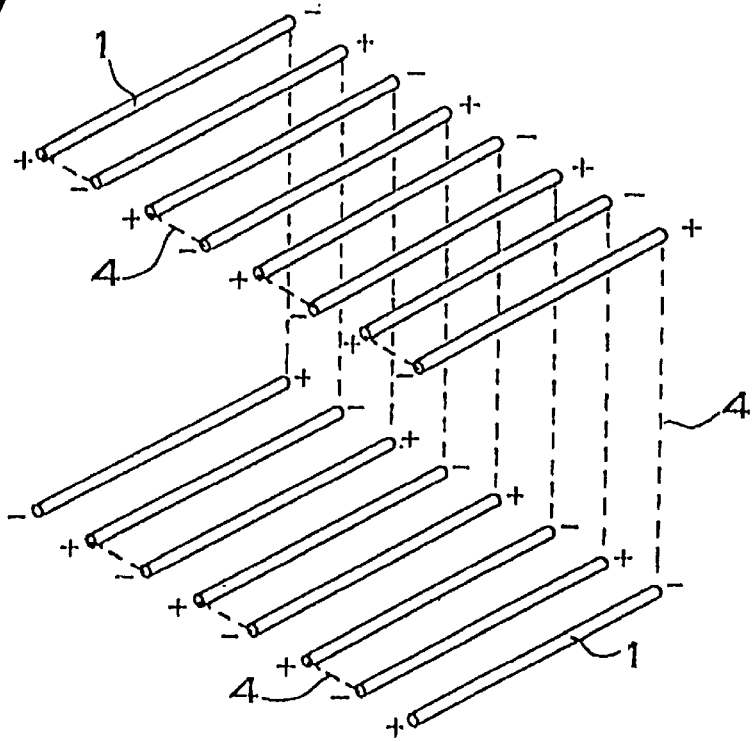
FIG. 27 is a diagrammatic oblique view showing a plurality of power modules connected in series by the pass bars.

The holder-case 2 shown in FIG. 6 has two levels vertically and houses 8 power module 1 rows. In this holder-case 2, the end-plate 3 at one end connects power modules 1 in series by housing pass bars 4 laterally, and the end-plate 3 at the other end connects power modules 1 in series by housing pass bars 4 vertically. As shown in the diagrammatic oblique view of FIG. 27, this connects all power modules in series. Therefore, the end-plate 3 attached to one end of the holder-case 2, as shown in FIGS. 22 through 24, houses pass bars 4 oriented in the lateral direction, and the end-plate 3 attached to the other holder-case 2, as shown in FIG. 25, houses pass bars 4 oriented in the vertical direction. As shown in FIG. 26, the frame section 283A provided with pass bars insertion cavities 2818 in both lateral and vertical directions can be attached to either end of a holder-case 2.

Frame sections 3A are provided with windows 20 at both ends of pass bar insertion cavities 18 for connecting pass bars 4 to power module 1 electrode terminals 5. The windows 20 are opened in a shape allowing power module 1 electrode terminals 5 fixed to battery 6 electrodes to fit in the windows without rotation. The power modules 1 shown in the figures have square electrode terminals 5 fixed to both ends. Windows 20 which fit these electrode terminals 5 are approximately the same size as the outline of the electrode terminals 5, but more precisely, are formed with inside shapes slightly larger than the electrode terminals 5. In this type of frame section 3A, power module 1 electrode terminals 5 insert into windows 20 to retain the power modules 1 without rotation and allow pass bar 4 connection.

Further, frame sections 3A shown in the figures are provided with lead wire grooves 21 to hold lead wires in fixed positions. Lead wire grooves 21 are extended in the lengthwise direction of holder-case 2 and provided approximately at the middle of the backside of frame section 3A. Stopper clasps 22 are provided in the openings of the lead wire grooves 21 to prevent the lead wires from falling out. Stopper clasps 22 are located on opposing sides of the openings of the lead wire grooves 21. Gaps between opposing stopper clasps 22 are made approximately equal to the lead wire thickness. These stopper clasps 22 allow the lead wires to be easily inserted into the lead wire grooves 21, but make it difficult for the lead wires to fall out of the lead wire grooves 21.

Lead wires are connected to pass bars 4 via fuses 8 for measurement of the voltage of each power module 1. Frame sections 3A are provided with fuse cavities 23 to retain fuses 8 in fixed positions. The fuse cavities 23 are made to connect with the lead wire grooves 21. Cut-outs 24 are provided in the partitions between fuse cavities 23 and pass bar insertion cavities 18 to run lead plates connecting fuses 8 and pass bars 4.

Further, frame sections 3A shown in FIGS. 22 through 25 are provided with sensor connecting plate insertion cavities 26 on their backside to hold sensor connecting plates 25 in fixed positions. Sensor connecting plate insertion cavities 26 are adjacent to bottom parts of pass bar insertion cavities 18. Sensor connecting plates 25, which insert into sensor connecting plate insertion cavities 26, connect temperature sensors 13, fixed to power modules 1, in series. Adjacent power module 1 sensor leads 14 are connected to sensor connecting plates 25 to connect all temperature sensors 13 in series.

To connect sensor leads 14 to sensor connecting plates 25, frame sections 3A are provided with connecting holes 27 to allow passage of sensor leads 14. Connecting holes 27 are formed on the outside of windows 20, and disposed in a position allowing passage of sensor leads 14 projecting from power modules 1. Sensor leads 14, which project from power modules 1, pass through the frame section 3 connecting holes 27 to be connected to the sensor connecting plates 25 via setscrews 35.

Temperature sensors 13, mutually connected in series, output their measurement signals to external devices via lead wires. If any temperature sensor 13 detects that battery temperature has risen abnormally high, a signal issued from that temperature sensor 13 is processed by an externally connected device such as a protection circuit. For example, an external protection circuit limits, or cuts-off battery 6 charge-discharge current to protect the batteries 6.

Frame sections 3A are provided with periphery walls 28 established around the periphery of a frame section 3A and projecting from its backside to hold a cover section 3B in a fixed position. A frame section 3A with periphery walls 28 can be layered with a cover section 3B to accurately fix the position of the cover section 3B with no slippage out of alignment. Further, both a cover section 3B and a water resistant cover 29 can be layered in fixed positions inside the periphery walls 28 for attachment to a frame section 3A. A configuration which connects and fixes the outside periphery of the water resistant cover 29 to the inside surface of the periphery walls 28 in a water resistant fashion has the characteristic that the end-plate 3 can be a reliable water resistant structure.

A cover section 3B is layered on, and fixed to a frame section 3A sealing open regions of pass bar insertion cavities 18 and lead wire grooves 21. In this configuration, the frame section 3A and cover section 3B sandwich the pass bars 4 and lead wires to retain them in fixed positions. With the cover section 3B connected and fixed to the frame section 3A, pass bars 4, sensor connecting plates 25, and lead wires are set in fixed positions and do not fall outside the end-plate 3. The outline of a cover section 3B is made approximately equal to the shape of the inside surface of the periphery walls 28 provided on a frame section 3A. A cover section 3B fits into the periphery walls 28 of a frame section 3A to fix its position and form a layered end-plate 3.

The cover section 3B shown in FIGS. 22 and 23 has windows 20 opened in the same positions as windows 20 provided through the frame section 3A. In this end-plate 3, windows 20 are opened in corresponding locations through both the frame section 3A and the cover section 3B, and pass bars 4 housed within the end-plate 3 can be connected with power module 1 electrode terminals 5 via setscrews. However, in the power source of the present invention, it is not always necessary to provide windows with a cover section. This is because after pass bars are set in pass bar insertion cavities of frame section and connected to power module 1 electrode terminals 1 via a setscrew, the cover section can also be connected and fixed to the frame section. A cover section without windows has the characteristic that open regions of the pass bar insertion cavities 18 can be completely sealed and pass bars can be exchanged independently by removing the cover section.

Figure 28:
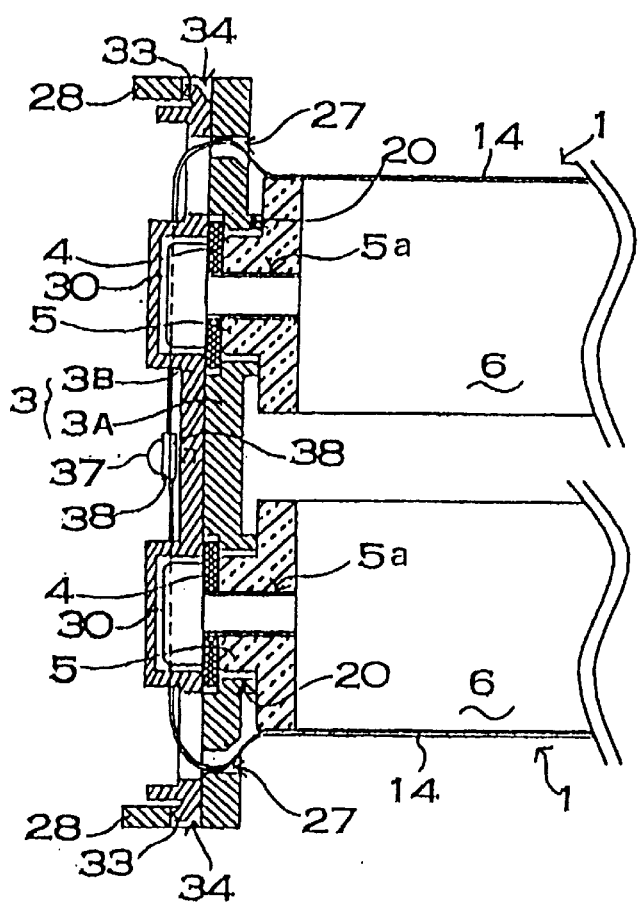
FIG. 28 is a cross-section view showing the end-plate, pass bar and power module connecting structure.

Further, the cover section 3B without windows, as shown in FIG. 28, connects sensor leads 14 without touching other metal plates fixed to a frame section by slipping out of alignment or by extending on the backside of the cover section. Therefore, the cover section 3B has the characteristic that the sensor leads can be protected from electrical short circuits without covering them with insulating material.

The cover section 3B is provided with cut-outs 31 in its periphery to connect power module 1 sensor leads 14 to sensor connecting plates 25. The cut-outs 31 are disposed outward of the windows 20. In addition, the cover section 3B is provided with projections, formed of single-piece construction, around the periphery and window 20 edges. These projections not only reinforce the cover section 313, but also effectively prevent water or other fluid ingress through windows 20 or cut-outs 31 into the inside of the end-plate 3.

The cover section 3B shown in FIGS. 22 and 23 has lead extraction openings 32A at both ends to extract lead wires from the end-plate 3. Lead wires set in lead wire grooves 21 are available externally from the extraction openings 32A.

Stopper projections 33 of single-piece construction are provided on the periphery edge of the cover section 3B to allow insertion and connection of the cover section 3B into the periphery walls 28 of the frame section 3A. The cover section 3B shown in FIGS. 22 and 23 is formed in an overall rectangular shape with a plurality of stopper projections 33 protruding from each edge. Stopper depressions 34 are provided on the inside surface of the periphery walls 28 of the frame section 3A to mate with stopper projections 33. The cover section 3B is connected in a fixed position to the frame section 3A by fitting stopper projections 33 into stopper depressions 34. In the end-plate 3 of these figures, stopper projections 33 are provided in the cover section 3B and stopper depressions 34 are provided in the frame section 3A, but stopper projections 33 may be provided in the frame section 3A and stopper depressions 34 provided in the cover section 3B to also connect the cover section in a fixed position on the frame section. Further, stopper projections may be provided only on the inside edges of periphery walls of the frame section, and the cover section can be pushed in beyond these stopper projections to join the cover section to the frame section.

This type of snap-insertion structure described above has the characteristic that the end-plate 3 cover section 3B and frame section 3A can be simply, easily and quickly connected and disconnected. However, the cover section may also be connected with the frame section by a configuration including spot welds, local bonding, or screw connection, etc.

The water resistant cover 29, which is layered onto the outside surface of the cover section 313, is a plastic plate, has an outline shape approximately equal to the shape of the inside of the periphery walls 28 of the frame section 3A, and has lead wire extraction cut-outs 29A and power cord access holes 29B opened through it.

This invention may be embodied in several forms without departing from the spirit of essential characteristics thereof, and the present embodiment is therefore only illustrative and not limiting. The scope of the invention is defined by the appended claims rather than by the description preceding them, and all changes that fall within meets and bounds of the claims, or equivalence of such meets and bounds thereof are therefore intended to be embraced by the claims.

What is claimed is:

1. A power source comprising:
   a holder-case;
   power modules arranged in a parallel relationship in said holder-case;
   end plates including pass bars for connecting said power modules in series;
   temperature sensors for detecting a temperature of said power modules;
   flexible sensor lead wires connected to said temperature sensors, said sensor lead wires projecting from ends of said power modules such that sensor lead wires projecting from adjacent power modules are directly connected to form a connection portion, said connection portion being attached to an outer surface of one of said end plates via a connecting implement including a setscrew threaded into a threaded screw hole formed in said outer surface of said one of said end plates.

2. The power source of claim 1, wherein said connecting implement further includes a metal ring connected to an end of each of said sensor lead wires projecting from said ends of said power modules, said setscrew being arranged to pass through said metal ring of each of said sensor lead wires projecting from adjacent power modules and thread into said threaded screw hole so as to form said connection portion and so as to attach said connection portion to said outer surface of said one of said end plates.

3. The power source of claim 1, wherein said connecting implement further includes a nut at said one of said end plates to form said threaded screw hole.

4. The power source of claim 1, wherein each of said end plates include connecting holes to allow said sensor lead wires projecting from ends of said power modules to pass therethrough.

5. The power source of claim 1, wherein said sensor lead wires project a substantially equal distance from both ends of each of said power modules, and said connection portion is formed at a mid-point between said adjacent power modules.

6. The power source of claim 1, wherein said sensor lead wires project a different distance from both ends of each of said power modules.

7. The power source of claim 1, wherein each of said power modules includes a plurality of rechargeable batteries joined in a linear manner.

8. The power source of claim 7, wherein said rechargeable batteries comprise nickel-hydrogen batteries.

9. The power source of claim 7, wherein said rechargeable batteries comprise nickel-cadmium batteries.

10. The power source of claim 7, wherein said rechargeable batteries comprise lithium-ion batteries.

11. The power source of claim 7, wherein at least one of said temperature sensors is attached to a surface of each of said rechargeable batteries.

12. The power source of claim 11, wherein said temperature sensors attached to said rechargeable batteries are connected in series in a linear manner by said sensor lead wires.

13. The power source of claim 1, wherein each of said power modules includes a plurality of super-capacitors joined in a linear manner.

14. The power source of claim 13, wherein at least one of said temperature sensors is attached to a surface of each of said super-capacitors.

15. The power source of claim 1, wherein said temperature sensors comprise PTC devices operable to change electrical resistance based on a change in sensed temperature.

16. The power source of claim 1, wherein each of said temperature sensors are fixed to a surface of said power modules by heat-shrink tubing covering said surface of said power modules.

17. The power source of claim 1, wherein all of said temperature sensors are connected in series via said sensor lead wires.

18. The power source of claim 1, wherein said sensor lead wires comprise conductive wires covered with an insulating material.

19. The power source of claim 1, wherein said holder case comprises a top cover casing, a bottom cover casing, and an intermediate casing arranged between said top cover casing and said bottom cover casing, each of said top cover casing, said bottom cover casing, and said intermediate casing including integral holder ribs for sandwiching and retaining said power modules in fixed positions.

20. The power source of claim 19, wherein each of said holder ribs has retaining cavities formed therein, said retaining cavities having a shape conforming to a shape of an outer surface of said power modules.

21. The power source of claim 20, wherein each of said holder ribs further has a guiding groove for guiding said temperature sensors and said sensor lead wires.

22. The power source of claim 1, wherein each of said end plates includes a frame section and a cover section separate from said frame section, said frame section and said cover section being layered together such that said frame section faces said power modules.

23. The power source of claim 22, further comprising measuring leads connected to each of said power modules for independently measuring a voltage of each of said power modules, said frame section of each of said end plates having a lead wire groove for retaining said measuring leads.

24. The power source of claim 23, wherein said lead wire groove of said frame section of each of said end plates extends in a lengthwise direction of said holder case and is located at a central portion of an outer surface of said frame section.

25. The power source of claim 23, wherein said frame section of each of said end plates has stopper clasps at said lead wire groove to prevent said measuring leads from falling out of said lead wire groove.

26. The power source of claim 25, wherein said stopper clasps are located at opposing sides of said lead wire groove.

27. The power source of claim 26, wherein a gap is arranged between stopper clasps located at opposing sides of said lead wire groove, said gap being approximately equal to a thickness of said measuring leads.

28. The power source of claim 23, wherein said measuring leads are connected to said power modules by fuses, said frame section of each of said end plates having fuse cavities for housing said fuses.

29. The power source of claim 28, wherein said fuse cavities are connected to said lead wire groove.

30. The power source of claim 23, wherein said cover section of each of said end plates is connected to said frame section, said measuring leads being set in fixed positions at said end plates.

31. The power source of claim 22, wherein said frame section of each of said end plates has integral peripheral walls, said cover section of each of said end plates being fitted to said frame section against an inside surface of said peripheral walls.

32. The power source of claim 31, wherein each of said end plates further includes a water-resistant cover layered on said cover section against said inside surface of said peripheral walls.

* * * * *